Dec. 26, 1950     W. CHASE     2,536,001

COOLING INSTRUMENT

Filed June 3, 1949

INVENTOR

William Chase

BY *Joseph Rossman*

ATTORNEY

UNITED STATES PATENT OFFICE 2,536,001

COOLING INSTRUMENT

William Chase, Chevy Chase, Md.

Application June 3, 1949, Serial No. 96,865

5 Claims. (Cl. 62—91.5)

This invention relates to a manual instrument for application to restricted areas or objects for cooling same. More specifically, the invention relates to an instrument provided with an element adapted for contacting teeth to test the vitality and health thereof and means for cooling the element to a relatively low temperature.

Figure 1:
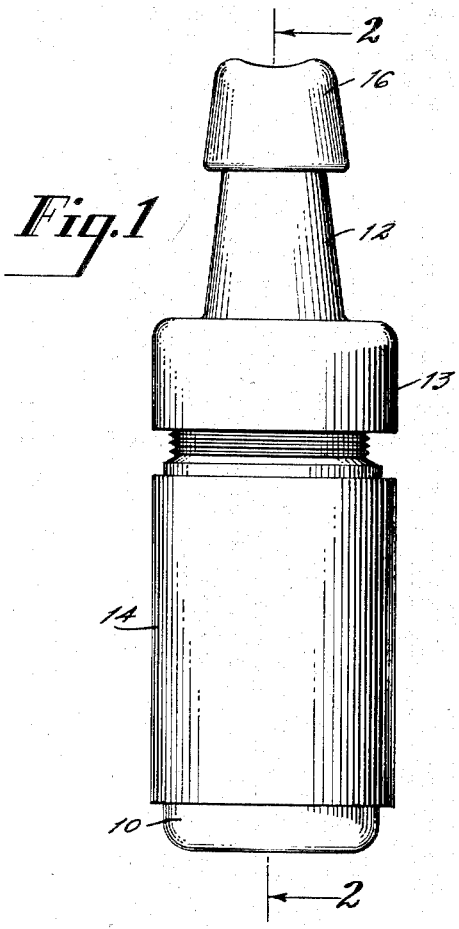
Figure 2:
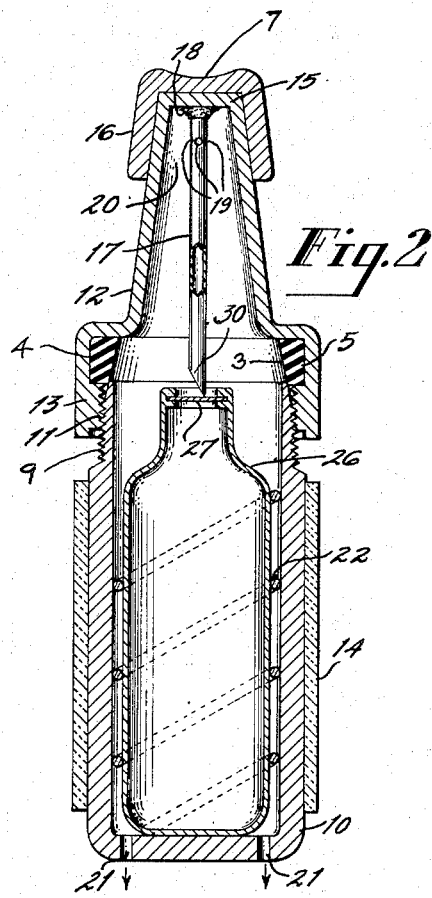
Figure 3:
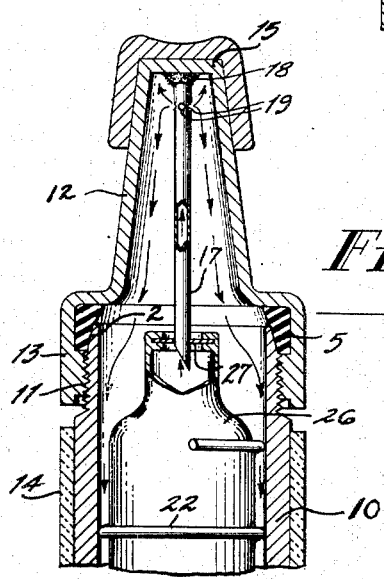

Further details and advantages of the invention will be apparent from the following description and accompanying drawings, wherein Figure 1 is a front elevational view of a tooth vitality tester constructed in accordance with my invention, Figure 2 is a sectional view taken on lines 2—2 of Figure 1, and Figure 3 is a partial sectional view similar to Figure 2 showing the parts arranged in condition for use in testing purposes.

The dental profession finds it necessary frequently to determine the condition of a pulp in a tooth by applying to the tooth a piece of ice and noting the patient's reaction of sensitivity. The procurement of ice for this purpose is usually very inconvenient and even when it is available it must be reduced to proper shape and size. Furthermore, the ice melts during handling and application so that such testing procedure is messy and cumbersome. According to my invention, I provide a simple instrument which has an element for contacting the tooth to be tested and self-contained means are provided within the instrument for cooling the contact element to a relatively low temperature without the use of ice, but by means of a volatile refrigerant or gas which upon expansion will cool the contact element.

Referring to the drawings, the instrument consists of a hollow cylindrical receiver or holder 10 made of metal or other suitable material which is adapted to receive and retain therein a suitable cartridge 26 filled with a refrigerating gas or liquid under pressure which is sealed by a puncturable diaphragm 27. The cartridge holder 10 is externally threaded at its upper open end at 11 and is also provided with a plurality of apertures or openings 21 at the bottom communicating with the interior of the holder. The upper edges of the holder 10 are tapered inwardly at 2, as shown in Figure 3, for a purpose to be explained later. A spiral spring 22 is loosely retained in the holder and is adapted to embrace and receive the cartridge 26. The assembled cartridge and spring are of suitable dimensions so that they can be readily inserted in the holder 10 at the open end thereof to assume the position shown in Figure 2 so that the diaphragm 27 of the cartridge is positioned adjacent the upper end of the receiver 10. The receiver 10 may be provided with a heat insulating jacket 14 embracing its outer periphery made of cork, rubber or other heat insulating material so that when the instrument is cooled as will be explained later it can be held comfortably in the hand for testing purposes.

In order to close the receiver 10 I provide a hollow closure 12 made of metal or suitable material which is threaded internally at its open end so as to mate with the threads 11 on the upper portion of the receiver 10, as shown in Figure 2. The closure head is provided with an integral tapered elongated extension or neck portion 12 terminating in a head portion 15. A hollow steel puncture needle 17 is affixed to the head 15 at 18 by welding or other suitable means so as to extend downwardly within the interior of the extension 12. The needle 17 is provided with a sharp cutting point at its lower end by cutting the end at an angle as indicated by numeral 30 for puncturing the diaphragm 27. The needle is also provided with a plurality of spaced perforations 19 adjacent the head 15.

The closure 12 is also provided with an internal shoulder or recess 4 for receiving a yieldable gasket 5 made of rubber or other resilient compressible material which is adapted to seal the joint between the receiver and closure when they are assembled for use. The gasket 5 is preferably beveled at its internal surface 3 which is presented to the interior of the closure so that when the closure 12 is turned and screwed down upon the threads 11 of the receiver from the position shown in Figure 2 to the position shown in Figure 3, the inwardly tapered upper edges 2 of the holder 10 will make firm contact with the tapered face 3 of the gasket 5 and compress same so as to form a tight seal.

A removable hollow contact element 16 is provided, made of silver or other thermally conductive metal, which is frictionally retained on the exterior end of the head 15 by being shaped internally so as to snugly fit the head as shown in Figure 2. The upper face 7 of the contact element may be concaved in contour so as to facilitate contact with the convex surface of tooth to be tested. The removable contact element can be formed of any desired shape or contour depending upon the specific use of the instrument. If desired the separately removable contact element 16 can be eliminated and the exposed portion of the head 15 can be utilized directly as the contact element.

When the instrument is to be used a cartridge 26 containing a refrigerant liquid or gas under pressure is first inserted in the holder or receiver 10. The closure 15 is then positioned so as to cause the threads 9 and 11 to interengage as shown in Figure 1. The closure is then turned further until it assumes the final position shown in Figure 3 so that in this position the needle 17 will puncture the diaphragm 27 and the tapered end 2 of receiver 10 is in sealed engagement with the gasket 5. The refrigerant in cartridge 26 being under pressure will then flow upwardly through the needle 17 and expand through the openings 19 adjacent the head 15, whereby the head will be quickly cooled to a low temperature. The expanded refrigerating gases will then flow downwardly in the neck portion 12 as indicated by the arrows in Figure 3, then downwardly into the receiver 10 adjacent the inner walls thereof along the space provided by the coiled spring 22 between the walls of the receiver and the cartridge and finally out of the receiver through the openings 21 at the bottom thereof.

The cooled head 15 in turn cools the contact element 7 retained thereon which is adapted for contacting the tooth to be tested. The contact element can be readily removed, washed and sterilized as often as necessary.

From the foregoing description it will be obvious that the instrument constructed according to my invention is simple in construction and has no parts which will get out of order. The cartridge 26 can be easily replaced and the instrument made ready for use by simply turning the head into proper engagement with the receiver until the needle punctures the diaphragm in the cartridge.

Although the instrument as described is adapted particularly for testing the vitality of teeth, it is obvious that the head can be given any other shape or contour, and can be used for application to other parts of the body or for application to any object or restricted area which it is desired to cool. My instrument therefore can be constructed so as to embody numerous modifications and changes depending upon its specific intended use. Such modifications and changes are intended to be included within the scope of the appended claims.

I claim:

1. An instrument for cooling localized areas comprising a holder for receiving a refrigerant-containing cartridge, a closure for said holder, puncturing means in said closure for puncturing said cartridge to release the refrigerant therein, said holder being provided with apertures to permit escape of released refrigerant, and a closed imperforate head portion having a heat-exchange contacting portion integral with said closure adapted to be cooled by the released refrigerant.

2. An instrument for cooling localized areas comprising a holder for receiving a refrigerant-containing cartridge, a closure for said holder, puncturing means in said closure for puncturing said cartridge to release the refrigerant therein, said holder being provided with apertures to permit escape of released refrigerant, a closed imperforate head portion integral with said closure adapted to be chilled by the released refrigerant, and a contact element retained on said head for contacting the area to be cooled.

3. An instrument for cooling localized areas which comprises a cylindrical holder for receiving a refrigerant-containing cartridge, the upper end of said holder being externally threaded, said holder being provided with apertures to permit escape of released refrigerant, a hollow closure member for closing said holder, said closure member being threaded internally at its open end for engagement with the threads on said holder, a recess in said closure for retaining a resilient sealing gasket, an elongated hollow extension integral with said closure member terminating in a head portion, a hollow needle affixed to said head and extending downwardly and internally thereof, said needle being provided with openings adjacent said head portion for permitting escape of refrigerant therefrom.

4. An instrument for testing the vitality of teeth which comprises a cylindrical holder for receiving a refrigerant-containing cartridge, the upper end of said holder being externally threaded, said holder being provided with apertures to permit escape of released refrigerant, a hollow closure member for closing said holder, said closure member being threaded internally at its open end for engagement with the threads on said holder, a recess in said closure for retaining a resilient sealing gasket, an elongated hollow extension integral with said closure member terminating in a head portion, a hollow needle affixed to said head and extending downwardly and internally thereof, said needle being provided with openings adjacent said head portion for permitting escape of refrigerant therefrom, and a hollow contact member frictionally retained on said head.

5. An instrument for testing the vitality of teeth which comprises a cylindrical holder for receiving a refrigerant-containing cartridge, the upper end of said holder being externally threaded, said holder being provided with apertures to permit escape of released refrigerant, a hollow closure member for closing said holder, said closure member being threaded internally at its open end for engagement with the threads on said holder, a recess in said closure for retaining a resilient sealing gasket, an elongated hollow extension integral with said closure member terminating in a head portion, a hollow needle affixed to said head and extending downwardly and internally thereof, said needle being provided with openings adjacent said head portion for permitting escape of refrigerant therefrom, and a hollow contact member frictionally retained on said head and having a concaved contact surface for contacting teeth to be tested.

WILLIAM CHASE.

REFERENCES CITED

The following references are of record in the file of this patent:

UNITED STATES PATENTS

| Number | Name | Date |
|---|---|---|
| 2,129,987 | Berkson | Sept. 13, 1938 |
| 2,305,367 | Webb | Dec. 15, 1942 |
| 2,307,013 | Batzle | Jan. 5, 1943 |
| 2,493,759 | Freygang | Jan. 10, 1950 |